US012498293B2

(12) United States Patent
Wu et al.

(10) Patent No.: US 12,498,293 B2
(45) Date of Patent: Dec. 16, 2025

(54) MULTI-CONFIGURABLE WAVEFRONT TESTER

(71) Applicant: MLOptic Corp, Redmond, WA (US)

(72) Inventors: Pengfei Wu, Bellevue, WA (US); Wei Zhou, Sammamish, WA (US); Wei Wang, Nanjing (CN); Yongshui Cai, Nanjing (CN)

(73) Assignee: MLOptic Corp., Redmond, WA (US)

( * ) Notice: Subject to any disclaimer, the term of this patent is extended or adjusted under 35 U.S.C. 154(b) by 0 days.

(21) Appl. No.: 18/620,384

(22) Filed: Mar. 28, 2024

(65) Prior Publication Data

US 2024/0319041 A1    Sep. 26, 2024

Related U.S. Application Data

(63) Continuation-in-part of application No. 18/123,801, filed on Mar. 20, 2023, now abandoned.

(51) Int. Cl.
*G01M 11/02* (2006.01)
(52) U.S. Cl.
CPC .............................. *G01M 11/0257* (2013.01)
(58) Field of Classification Search
CPC ........... G01B 9/02034; G01B 9/02049; G01M 11/005; G01M 11/02; G01M 11/0207; G01M 11/0221; G01M 11/0242; G01M 11/04; G01M 11/0257; G01M 11/0292
See application file for complete search history.

(56) References Cited

U.S. PATENT DOCUMENTS

| | | | | |
|---|---|---|---|---|
| 5,844,670 A | * | 12/1998 | Morita | G01M 11/025 356/127 |
| 11,754,832 B1 | * | 9/2023 | Wu | G02B 27/1066 359/642 |
| 2006/0262322 A1 | * | 11/2006 | Brooks | G01B 9/02065 356/515 |
| 2010/0149549 A1 | * | 6/2010 | Negishi | G01M 11/0257 356/521 |
| 2019/0137255 A1 | * | 5/2019 | Chong | G01B 9/02091 |

FOREIGN PATENT DOCUMENTS

| | | | | |
|---|---|---|---|---|
| JP | 3740427 B2 | * | 2/2006 | ......... G01B 11/2441 |
| JP | 2022161124 A | * | 10/2022 | |

* cited by examiner

*Primary Examiner* — Michael A Lyons
(74) *Attorney, Agent, or Firm* — Jong Patent Firm; Cheng Ning Jong; Tracy P. Jong

(57) ABSTRACT

A wavefront tester for measuring the wavefront of a sample via an optical path, the wavefront tester including a mirror, an imaging lens, an aperture, a beam splitter, a wavefront sensor, a lens selection system including a plurality of optical lenses, a suitable optical lens of which is commensurate with the sample and selected to be disposed in the optical path and a light source directed in a first direction through the optical path by the beam splitter through the suitable optical lens and the sample to the mirror such that the light source is redirected in a second direction opposite the first direction through the optical path and the beam splitter, the aperture and the imaging lens to be received at the wavefront sensor.

6 Claims, 18 Drawing Sheets

| Actual angles | 0.0106 | 0.0183 | 0.0285 | 0.0373 | 0.0494 |
|---|---|---|---|---|---|
| Stdeva | 0.000132 | 0.00032 | 0.000165 | 0.000137 | 0.000539 |
| Accuracy | 0.000546 | 0.000714 | 0.001076 | 0.001382 | 0.000295 |
| Avg.Stdeva | 0.000259 | | | | |
| Avg.Accuracy | 0.000803 | | | | |

|  | Coarse | Fine | Coarse | Fine |
| --- | --- | --- | --- | --- |
| Actual angles (deg) | Measured Cal. (deg) | | Accuracy (Actual Angle − Measured Angle) | |
| 0.010556 | 0.011101 | 0.009879 | 0.000546 | -0.00068 |
| 0.018333 | 0.019047 | 0.019662 | 0.000714 | 0.001329 |
| 0.028458 | 0.029535 | 0.028468 | 0.001076 | 9.4E-06 |
| 0.028472 | 0.029187 | 0.02937 | 0.000715 | 0.000898 |
| 0.027892 | 0.029308 | 0.028063 | 0.001417 | 0.000171 |
| 0.028294 | 0.029481 | 0.028742 | 0.001187 | 0.000447 |
| 0.037285 | 0.038667 | 0.03699 | 0.001382 | -0.00029 |
| 0.037111 | 0.038122 | 0.03882 | 0.001011 | 0.001709 |
| 0.049389 | 0.049684 | 0.049592 | 0.000295 | 0.000203 |
| 0.047528 | 0.048198 | 0.051822 | 0.000671 | 0.004295 |
| 0.047556 | 0.048017 | 0.051747 | 0.000461 | 0.004192 |

*FIG. 12*

MULTI-CONFIGURABLE WAVEFRONT TESTER

PRIORITY CLAIM AND RELATED APPLICATIONS

This continuation-in-part application claims the benefit of priority from non-provisional application U.S. Ser. No. 18/123,801 filed Mar. 20, 2023. Said application is incorporated by reference in its entirety.

BACKGROUND OF THE INVENTION

1. The Field of the Invention

The present invention relates to a wavefront tester. More specifically, the present invention is directed to a multi-configurable wavefront tester.

2. Background Art

Wavefront measurements are useful for measuring directly, the phase and intensity of a light beam. Wavefront aberration is one of the most important parameters for an optical system and thus is critical for many applications, e.g., optical system alignment, Modulation Transfer Function (MTF) measurement, reflective surface testing, transparent optics testing, laser beam and optics, adaptive optics, ophthalmology and Augmented Reality/Virtual Reality (AR/VR) and Near-Eye Display. In the field of optical system alignment, optical alignment is a common problem and can be complicated and time consuming. Wavefront measurements provide valuable assessments for a successful alignment operation. Real-time measurements of on-axial and off-axial wavefronts allow the characterization of an optical alignment for both optic components and optical systems, enabling a quick and precise alignment of an optical beam such as its pupil position and tip/tilt angles. An MTF measurement is the most common way to characterize the optical quality. Most MTF measurements are based on measuring the contrast of a specific test pattern imaged by the lens of interest. However, the measurement does not allow tracing of the origin of the problem. Wavefront measurements provide the most complete way to characterize the quality of an optical system and an alternative way to measure MTF. A single wavefront measurement enables direct access to the aberrations of the lens of interest as well as the MTF measurement in all directions. In reflective surface testing, a wavefront sensor allows precise and reliable measurement of a mirror shape during or after polishing which is an act critical to obtain the desired optical quality. Wavefront measurements are also important to characterize wavefront errors of some regions of interest of mirrors including dielectric or metallic coatings of mirrors. In transparent optics testing, for transparent optics including optic plates, filters and dichroic beam splitter or coatings, the transmission measurements can be performed to obtain wavefront errors of the optics in either single pass or double pass.

In laser beam and optics, wavefront measurements are useful for characterizing the propagation of an electromagnetic field such as a laser beam in free space, making them very useful for diagnosis of laser beam and optics quality and related applications in laser system development, integration and maintenance. Adaptive optics has been used in many areas including astronomical telescopes, biomedical imaging systems and free-space optical communications.

The temporal measurement of wavefront distortion can be used to correct aberrations in optical systems to improve image quality. In ophthalmology, wavefront measurements can be used to assess an individual's visual performance and detect visual aberrations or distortions, which can aid in the diagnosis of visual disorders such as myopia, hyperopia and astigmatism. In an AR/VR and Near-Eye display, wavefront errors from the AR/VR light sources, micro display panels and waveguides are important indicators for assessment of AR/VR device quality. Wavefront measurements constitute a powerful tool to diagnose holographic waveguides, microlens, curved windows and heated windshields.

Optical surfaces shall be carefully characterized at each manufacturing step for almost all types of optics. Interferometers utilize the interference of superimposed electromagnetic waves to extract the phase and intensity information from an object under test. They have been widely used in the measurements of microscopic displacements, refractive index changes and surface irregularities for inspections of optical components or systems in both science and industry including astronomy, optics, engineering metrology, seismology, remote sensing, biomedicine, mechanical stress/strain measurement, velocimetry, and optometry. There are many different types of interferometers including Fizeau, Mach-Zehnder and Fabry-Pérot interferometers. In some instances, optical interferometry is specially designed for the high precision examination of surface topography using techniques, e.g., phase shifting interferometry and vertical scanning interferometry. Interferometers are very sensitive to the changes of test environments, such as vibration, movement, acoustic noise, air turbulence, temperature and humidity. They also have a very small dynamic range for measurements and are suitable only for measuring small changes rather than a large range of measurements. The field of view is typically narrow as well, which limits their ability to observe large objects or areas. In addition, the systems can be complex and difficult to set up and maintain, requiring specialized knowledge and technical skills. As such, most interferometers are expensive, especially those having high sensitivity and spatial resolution.

A Shack-Hartmann wavefront sensor utilizes a relatively new technique for wavefront measurements. It is a competitive alternative, offering an excellent trade-off in terms of performance, versatility and ease of use. The wavefront sensor combines a two-dimensional (2D) detector with a lenslet array. The sensor allows direct wavefront measurements rather than using interferences between beams to reconstruct a wavefront. These devices were developed for adaptive optics and have been widely used in optical metrology and laser diagnostics. Compared to the interferometers, a Shack-Hartmann wavefront sensor has a larger measurable range, and it is more resistant to test environmental variations. The sensor is also suitable for measuring large optics, which has been challenging, especially for some large mirrors that are designed to work in infrared spectral bands. The sensor can perform a rapid and accurate measurement of the curvature of optics surfaces. Interferometers are incapable of using such measurements due to their limited measurable ranges. A Shack-Hartmann sensor, however, has very limited spatial resolution and may not be able to accurately measure small wavefront distortions. It also requires a well-illuminated wavefront and may not work well with weak or poorly collimated light sources. As such, an effective calibration method is required to precisely measure the wavefront of an optical system. Wavefront measurements can be sensitive as small errors affect measurement results tremendously. As mechanical tolerances are much larger than the wavefront of an optical system, mechanical errors need to be removed for wavefront measurements to be effective. Further, a light source, e.g., laser source as well as a collimated laser beam are imperfect and alignment errors associated with the light source need to be removed as well. Actual optical amplifications may be slightly different from designed amplifications. In one calibration method, amplification numbers are applied directly from optics design to a software algorithm. However, this calibration method is highly dependent upon the mechanical tolerances as well as the alignment of optical devices. If the system is changed over time, the desired calibration may no longer be accurate. In another calibration method, an actual object is calibrated with a tester system, which requires the sensor to have a high spatial resolution to calibrate the measured and actual sizes of the object. Unfortunately, for a wavefront sensor, the resolution is normally very low as the pixel size is about 150 um. Currently available systems using Shack-Hartmann sensors do not offer multiple configurable features with automatic calibration or measurement processes. For different applications and requirements, multiple and different setups are required for successful measurements.

There exists a need for a multi-configurable wavefront tester capable of providing a suitable optical lens with a suitable focal length to allow a sample, e.g., a wedge under test to be measured to yield high resolution wavefront results all within a single wavefront tester, thereby avoiding the need for multiple different setups that can be costly to procure and maintain.

SUMMARY OF THE INVENTION

In accordance with the present invention, there is provided a wavefront tester for measuring the wavefront including the wedge angle of a sample via an optical path, the wavefront tester including:
  (a) a mirror;
  (b) an imaging lens;
  (c) an aperture;
  (d) a beam splitter;
  (e) a wavefront sensor;
  (f) a lens selection system including a plurality of optical lenses and at least one two-dimensional (2D) linear stage, an optical lens of the plurality of optical lenses is commensurate with the physical size of the sample and selected to be disposed in the optical path and the at least one 2D linear stage configured for facilitating the insertion of an optical lens of the lens selection system into the optical path at a location along the optical path or the removal of an optical lens of the lens selection system from the optical path and the at least one 2D linear stage is further configured to adjust the location along the optical path; and
  (g) a light source directed in a first direction through the optical path by the beam splitter through the optical lens and the sample to the mirror such that the light source is redirected in a second direction opposite the first direction through the optical path and the beam splitter, the aperture and the imaging lens to be received at the wavefront sensor.

In accordance with the present invention, there is further provided a wavefront tester for measuring the wavefront including the wedge angle of a sample via an optical path, the wavefront tester including:
  (a) an imaging lens;
  (b) an aperture;
  (c) a collimating lens;
  (d) a wavefront sensor;
  (e) a lens selection system including a plurality of optical lenses and at least one two-dimensional (2D) linear stage, an optical lens of the plurality of optical lenses is commensurate with the physical size of the sample and selected to be disposed in the optical path and the at least one 2D linear stage configured for facilitating the insertion of an optical lens of the lens selection system into the optical path at a location along the optical path or the removal of an optical lens of the lens selection system from the optical path and the at least one 2D linear stage is further configured to adjust the location along the optical path; and
  (f) a light source directed in a direction through the optical path characterized by the collimating lens, the sample, the optical lens, the aperture and the imaging lens to be received at the wavefront sensor.

In one embodiment, the at least one 2D linear stage is configured to be motorized.

In accordance with the present invention, there is further provided a wavefront tester for measuring the wavefront including the wedge angle of a sample via an optical path, the wavefront tester including:
  (a) a mirror;
  (b) an imaging lens;
  (c) an aperture;
  (d) a beam splitter;
  (e) a wavefront sensor;
  (f) a pre-collimating lens;
  (g) a beam expander including a first end and a second end, the beam expander configured to receive a beam at the first end and cause a width of the beam to be adjustable at the second end, wherein the beam expander is adjusted such that the width is commensurate with the physical size of the sample; and
  (h) a light source directed in a first direction through the optical path by the beam splitter through the pre-collimating lens, the beam expander from the first end to the second end and the sample to the mirror such that the light source is redirected in a second direction opposite the first direction through the optical path and the beam splitter, the aperture and the imaging lens to be received at the wavefront sensor.

In accordance with the present invention, there is further provided a wavefront tester for measuring the wavefront including the wedge angle of a sample via an optical path, said wavefront tester including:
  (a) an imaging lens;
  (b) an aperture;
  (c) a collimating lens;
  (d) a wavefront sensor;
  (e) a pre-collimating lens;
  (f) a beam expander including a first end and a second end, said beam expander configured to receive a beam at said first end and cause a width of the beam to be adjustable at said second end, wherein said beam expander is adjusted such that the width is commensurate with the physical size of the sample; and
  (g) a light source directed in a direction through the optical path characterized by said collimating lens, the sample, said beam expander, said pre-collimating lens, said aperture and said imaging lens to be received at said wavefront sensor.

In one embodiment, the light source can be a laser light source or a light emitting diode (LED) light source. In one embodiment, the light source is configured to be a spatial filtered light source with a spatial filter.

An object of the present invention is to provide a single wavefront tester capable of more than one configuration to allow the same tester to be used on samples of different sizes and therefore samples requiring different wavefront measurement resolutions.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 12 is a diagram depicting examples of the accuracy of wedge angle measurements in both coarse and fine measurement configurations using a setup shown in FIGS. 1-4;

PARTS LIST

Figure 1:
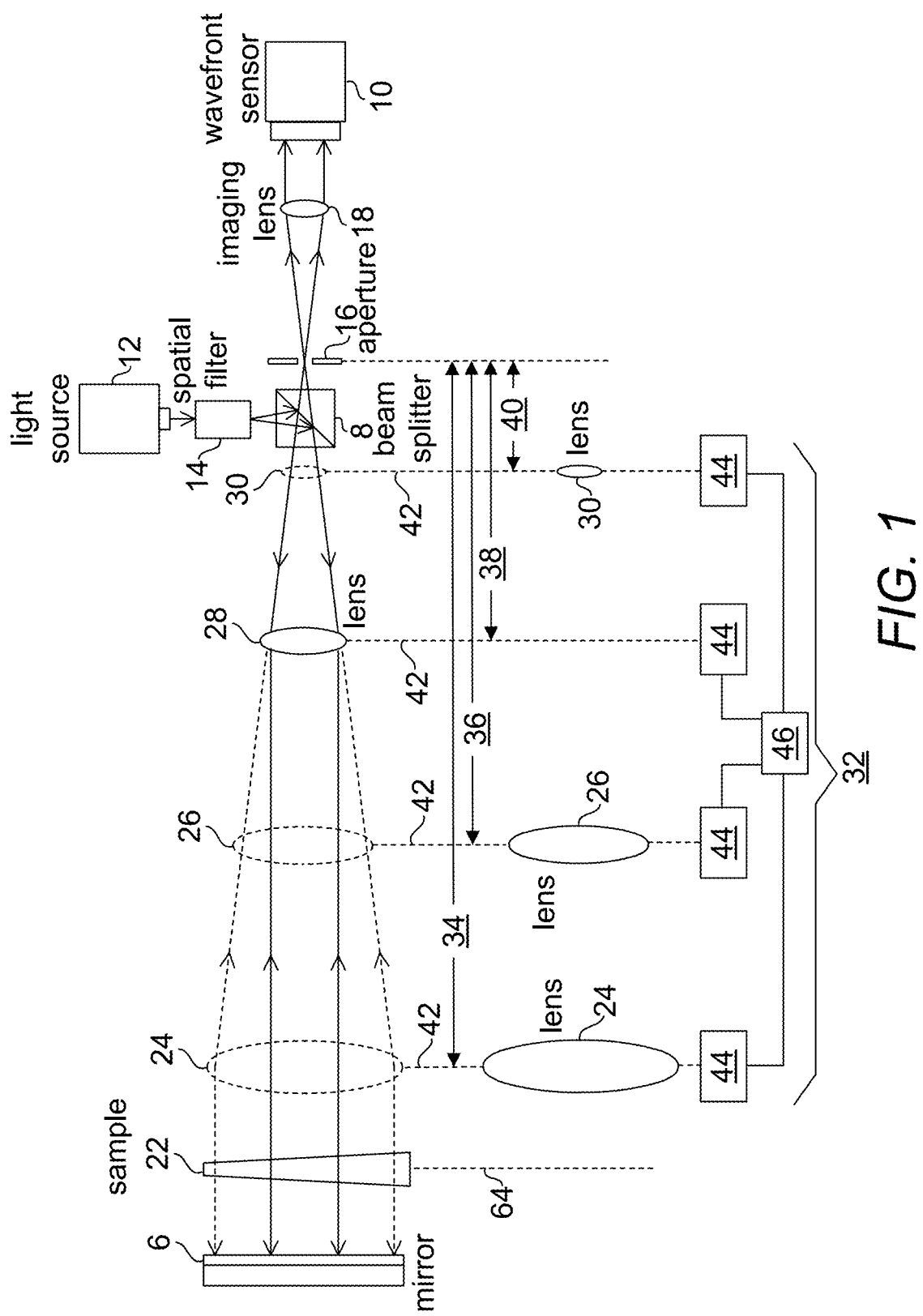
FIG. 1 is a diagram depicting a multi-configurable double-pass wavefront tester.

2—multi-configurable double-pass wavefront tester
4—multi-configurable single-pass wavefront tester
6—mirror
8—beam splitter
10—wavefront sensor
12—light source, e.g., laser, light emitting diode (LED)
14—spatial filter
16—aperture
18—imaging lens
20—collimating lens
22—sample
24—optical lens, e.g., collimating lens
26—optical lens, e.g., collimating lens
28—optical lens, e.g., collimating lens
30—optical lens, e.g., collimating lens
32—lens section system
34—distance between aperture and optical lens 24
36—distance between aperture and optical lens 26
38—distance between aperture and optical lens 28
40—distance between aperture and optical lens 30
42—linear stage, e.g., two-dimensional (2D) linear stage
44—motor
46—motor controller
48—step of selecting configuration
50—step of measuring air wavefront
52—step of inserting golden sample into optical path to be measured
54—step of calculating wavefront data, e.g., wedge angle
56—axial adjustment
58—lateral adjustment
60—pre-collimating lens
62—beam expander
64—transverse plane
66—width of output beam of beam expander
68—first lens of beam expander
70—second lens of beam expander

PARTICULAR ADVANTAGES OF THE INVENTION

The present multi-configurable wavefront tester utilizes a single system with a configurable optical lens depending on the required spatial resolution, testing speed and measurable size, thereby removing the need for multiple wavefront testers each for a sample of a unique size. This in turn allows data fusion and processing for high spatial resolution and large-area scanning, data visualizations in real time and after processing. Individual wavefront data sets from small area scans can be fused or combined into a whole large area, where individual wavefront data sets are each obtained by scanning a small area of a sample and then the individual wavefront data sets are combined with techniques to fuse the joint overlapping areas and borders smoothly. The present multi-configurable wavefront tester provides, among other results, wavefront Peak-to-Valley (PV) and Root-Mean-Square (RMS) values, curvature, wedge angle, tip and tilt, refractive power, intensity, focal point positions, spot diagram, Zernike coefficients, Modulation Transfer Function (MTF), Point Spread Function (PSF) and M Squared.

As a present multi-configurable wavefront tester allows the selection of a suitable optical lens from a plurality of optical lenses ranging in size and therefore focal point of the optical lenses, the user has a way to select the desired resolution in wavefront measurements. If coarse measurements are desired, wavefront measurements can be obtained in a "snapshot" fashion without scanning, using an optical lens commensurate with the physical size of the sample, thereby leaving the testing speed high. However, if higher resolution is desired, "fine scanning" can be adopted using a smaller optical lens to instead "zoom in" on multiple small areas for spatial details of the wavefront of a sample with a physical size that is comparatively larger. By scanning a relatively large area using a fine scanning configuration, detailed wavefront information can be obtained for a sample that is larger in physical size. The overall testing speed with fine scanning is however lower than the testing speed for the snapshot configuration.

DETAILED DESCRIPTION OF A PREFERRED EMBODIMENT

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

Figure 2:
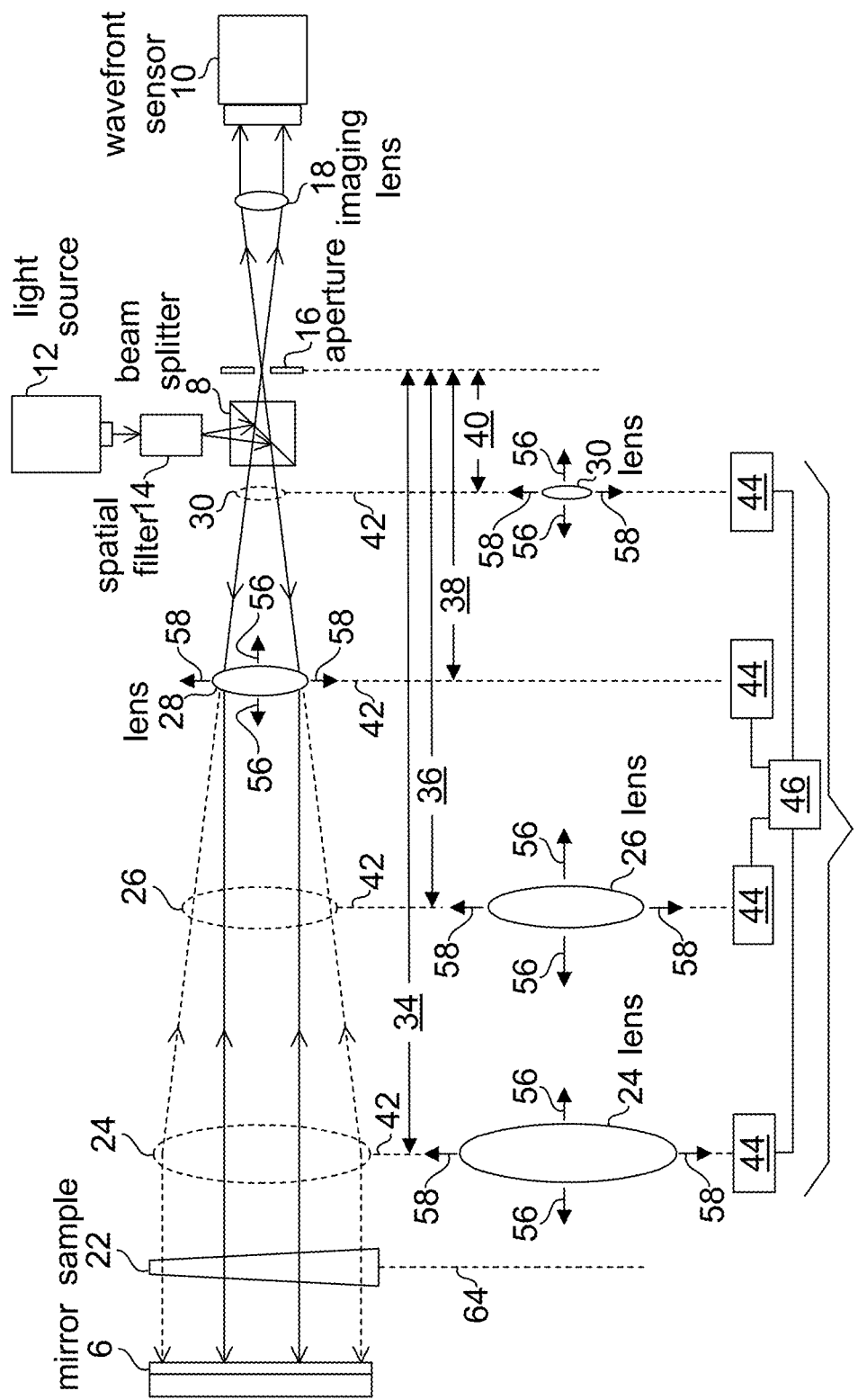
FIG. 2 is a diagram depicting a multi-configurable double-pass wavefront tester of FIG. 1 with at least one two-dimensional (2D) linear stage.
Figure 3:
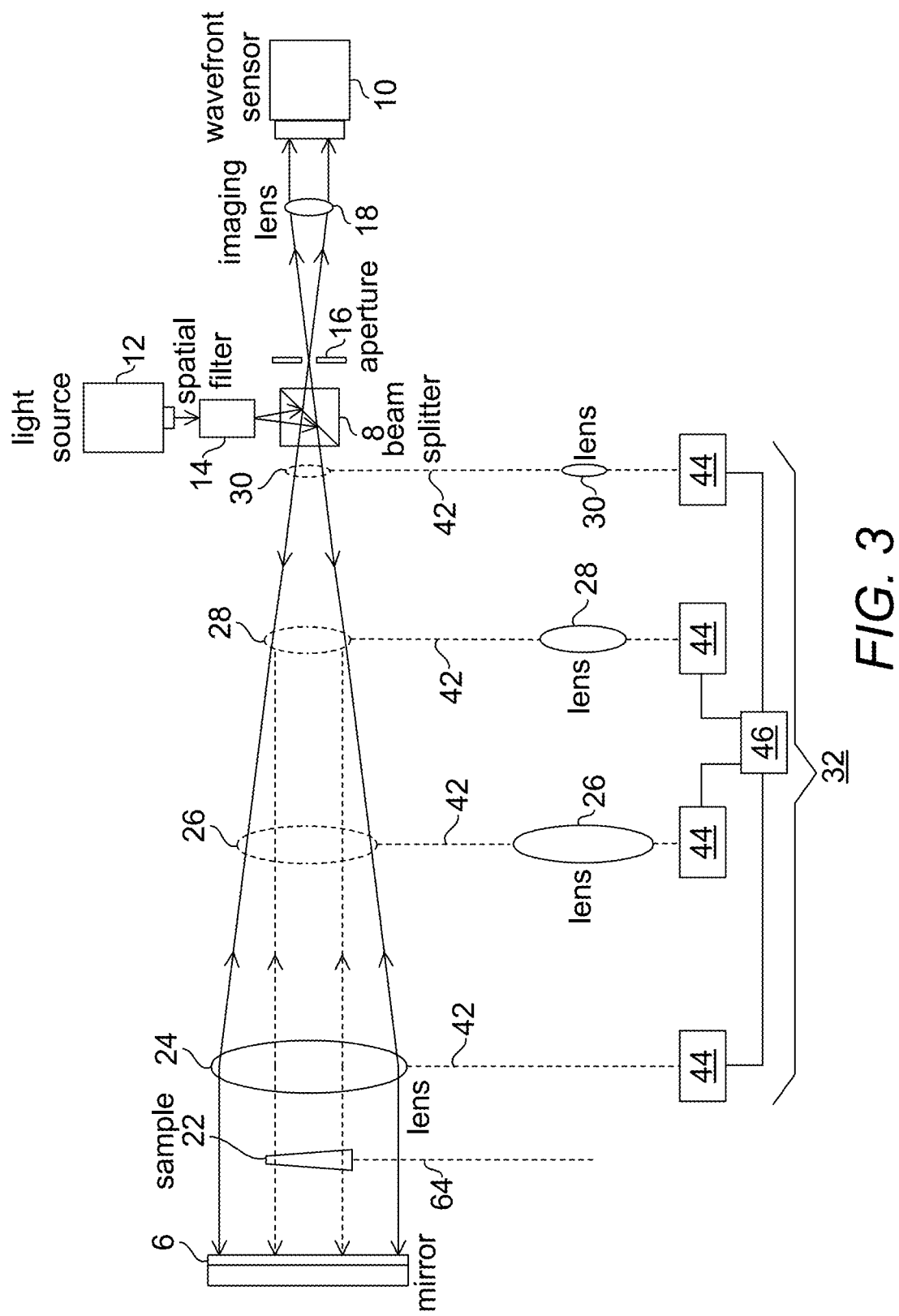
FIG. 3 is a diagram depicting a multi-configurable double-pass wavefront tester.
Figure 4:
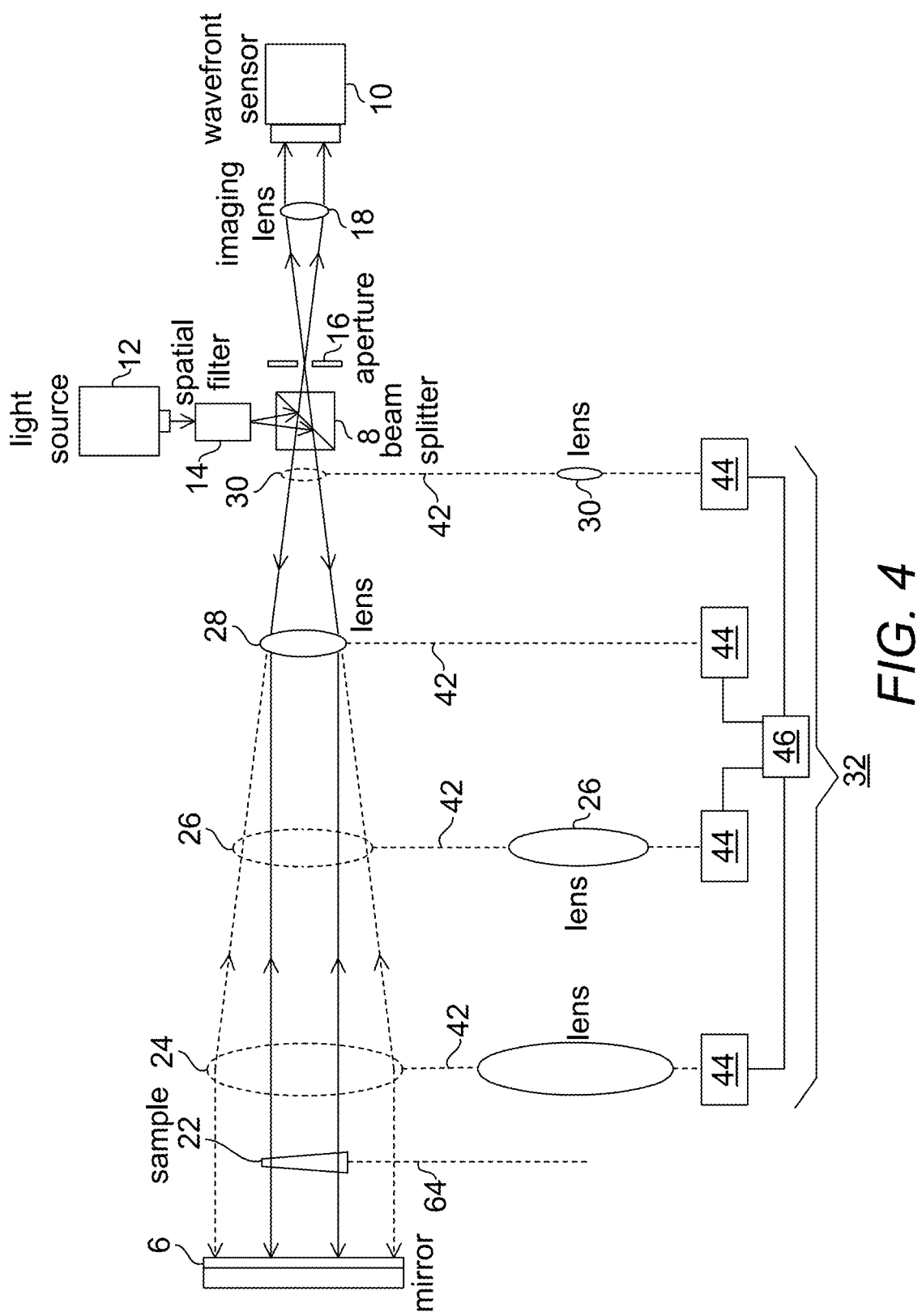
FIG. 4 is a diagram depicting a multi-configurable double-pass wavefront tester.

FIG. 1 is a diagram depicting a multi-configurable double-pass wavefront tester 2 for measuring the wavefront of a sample via an optical path. The wavefront tester includes a mirror 6, an imaging lens 18, an aperture 16, a beam splitter 8, a wavefront sensor 10, a lens selection system and a light source 12. In one embodiment, the light source is configured to be a spatial filtered light source with a spatial filter 14. The lens selection system 32 includes a plurality of optical lenses 24, 26, 28, 30, each disposed at a unique fixed distance from the aperture 16. Each of these optical lenses includes a unique focal length. In one example, the optical lens 24, 26, 28, 30 is disposed at distance 34, 36, 38, 40, respectively, from the aperture 16, illustrating the unique location of each lens with respect to the aperture 16 and hence the sample 22. Each optical lens 24, 26, 28, 30 is supported on a fixture disposed on a linear stage 42 configured to dispose the optical lens in the optical path or remove the optical lens from the optical path using, e.g., a motor 44 controlled using a motor controller 46. By automating the process of selecting a designated optical lens to be inserted in the optical path, the correct optical lens can be disposed precisely at the desired location in the optical path every time such optical lens is desired without any interventions from an operator, thereby removing potential human errors and increasing throughput in wavefront measurements. A suitable optical lens for the sample is selected to be disposed in the optical path while other optical lenses not used are retracted from the optical path. The light source 12 is directed in a first direction through the optical path by the beam splitter 8 through the suitable optical lens and the sample 22 to the mirror 6 such that the light source 12 is redirected in a second direction opposite the first direction through the optical path and the beam splitter 8, the aperture 16 and the imaging lens 18 to be received at the wavefront sensor 10. A wavefront sensor is a device used in optics to measure the properties of light waves. It is used to measure the shape and quality of an optical wavefront, which is a surface of constant phase that describes the propagation of light through space. The wavefront sensor works by detecting deviations in the phase of the light as it passes through sample 22, such as a wedge shown throughout herein. These deviations can be used to create a map of the wavefront, which can then be used to analyze and correct aberrations in the optical system. In a conventional wavefront tester, only one optical lens is provided regardless of the physical size of sample 22. For instance, for the height of sample 22 shown in FIG. 1, an inappropriately sized lens, e.g., lens 28, or a lens that is incapable of casting light from light source, e.g., laser or light emitting diode (LED), across the height of sample 22 is used. However, if optical lens 24 had been used, i.e., a lens capable of casting light across the height of sample 22, the light cast on the sample 22 would be commensurate with the physical size of the sample 22. FIG. 2 is a diagram depicting a multi-configurable double-pass wavefront tester of FIG. 1 with at least a two-dimensional (2D) linear stage. With a lens 24, 26, 28 or 30 disposed on a 2D linear stage, the flexibility to adjust its position along the optical path is provided. This allows for precise control over the focal length and position of the lens 24, 26, 28 or 30 along the optical path. By having the ability to move the lens 24, 26, 28 or 30 in and out of the optical path, it becomes easier to perform alignment tasks upon calibration. A lens can be quickly inserted into or removed from the optical path in the directions of lateral adjustments 58, without disturbing the overall setup as each lens that is already mounted on a lens support of the 2D linear stage, already has a prescribed path controlled by a motor 44. This can save time and effort while the repeatability of the lens positioning is ensured. For a new sample 22 for which no wavefront measurements have been taken or established for the sample 22 of a specific size and wedge angle, positioning of each of lenses 24, 26, 28 and 30, is calibrated, in which position adjustments 56 of the lens 24, 26, 28 or 30 along the optical path once the desired lens has been disposed in the optical path, are made to ensure an optimal distance between the lens 24, 26, 28 or 30, and the aperture 16 has been achieved, i.e., the resulting image received at imaging lens 18 has the desired diameter and focus that corresponds to the sample 22. If wavefront measurements of a higher resolution are desired, "fine scanning" can be adopted using a smaller one of the optical lens 24, 26, 28 and 30, to "zoom in" on multiple small areas, e.g., with the sample 22 moved in a direction along the transverse plane 64 such that wavefront measurements can be taken only of a new small area. This process can be repeated until data has been collected over the desired area of the sample 22. By scanning a relatively large area using a fine scanning configuration or in other words, by collecting wavefront data while the sample 22 is disposed in various positions in a transverse plane 64, e.g., using a linear stage, wavefront information can be obtained for a sample that is larger in physical size. As another example as shown in FIG. 3, if a sample 22 of a smaller size (height) had been used, optical lens 24 would not have been suitable as the light cast by optical lens 24 would result in coverage of unused areas, resulting in the inability of the wavefront sensor 10 to detect light at the highest resolution possible, thereby producing lower quality wavefront data. Therefore, for the sample 22 shown in FIG. 3, a suitable optical lens would have been optical lens 28 as shown disposed in the optical path of FIG. 4. In a conventional wavefront tester, only one optical lens is available for each tester. Therefore, for samples of significantly different sizes, several custom-made conventional wavefront testers would have been required to provide lenses of suitable sizes and focal lengths to produce wavefront measurement results of sufficient and required resolution as compared to a present wavefront tester already having a suitable optical lens for a wide range of sizes of a sample. For instance, for each of the optical lens 24, 26, 28, 30 to function according to the required resolution of wavefront measurements when deemed a suitable optical lens for a sample, the lens is disposed at a unique distance from the aperture 16 in the optical path. Double-pass wavefront testers as shown in FIGS. 1-4 are more compact and useful for generating wavefront measurements of higher resolution than those of single-pass wavefront testers as shown in FIGS. 5-8. Double-pass wavefront testers are further useful for measuring reflective-type optics while single-pass wavefront testers are only useful for measuring transparent optics. However, double-pass wavefront testers may not be used to measure large variations of wavefront or large wedge angles.

Figure 5:
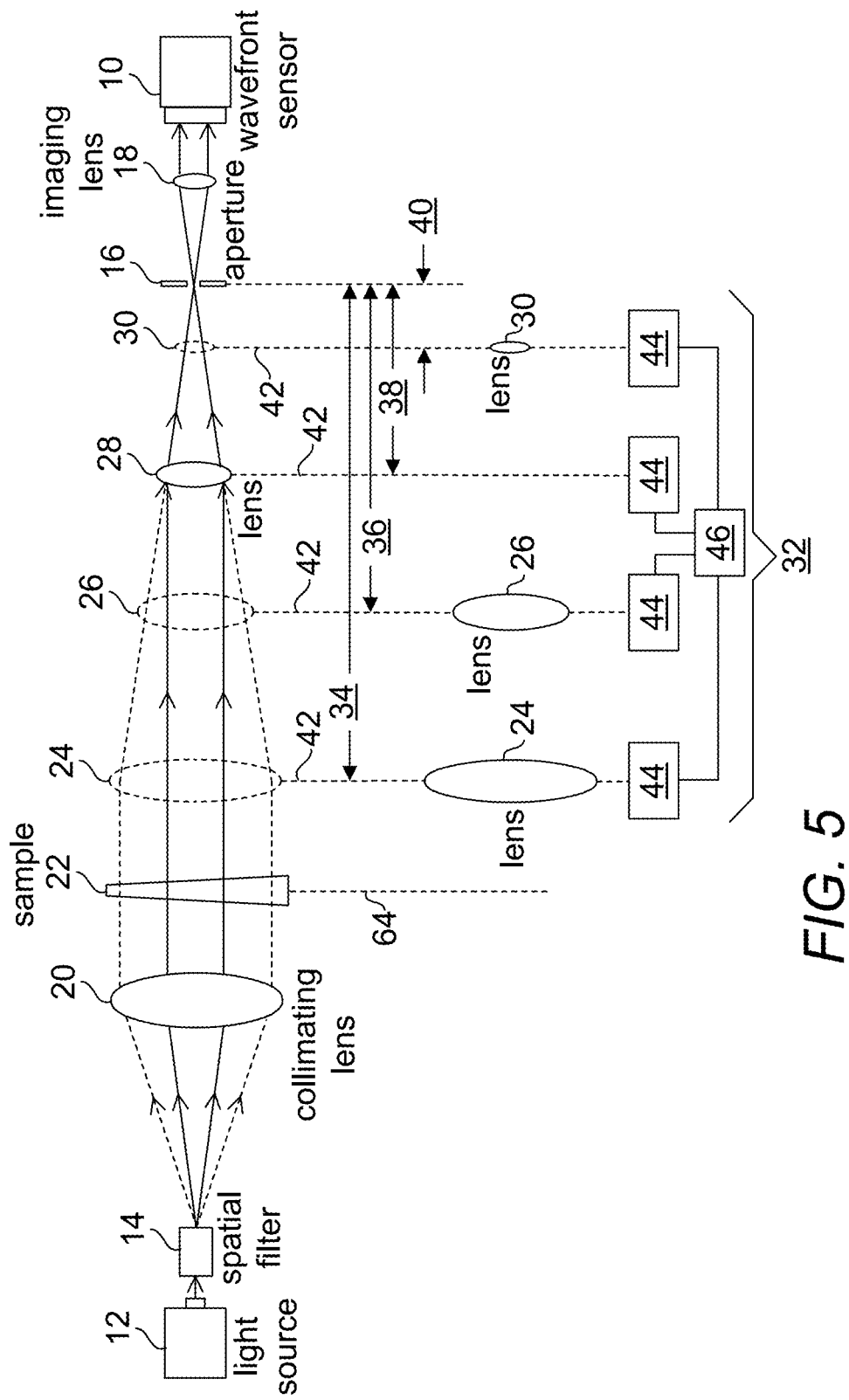
FIG. 5 is a diagram depicting a multi-configurable single-pass wavefront tester.
Figure 6:
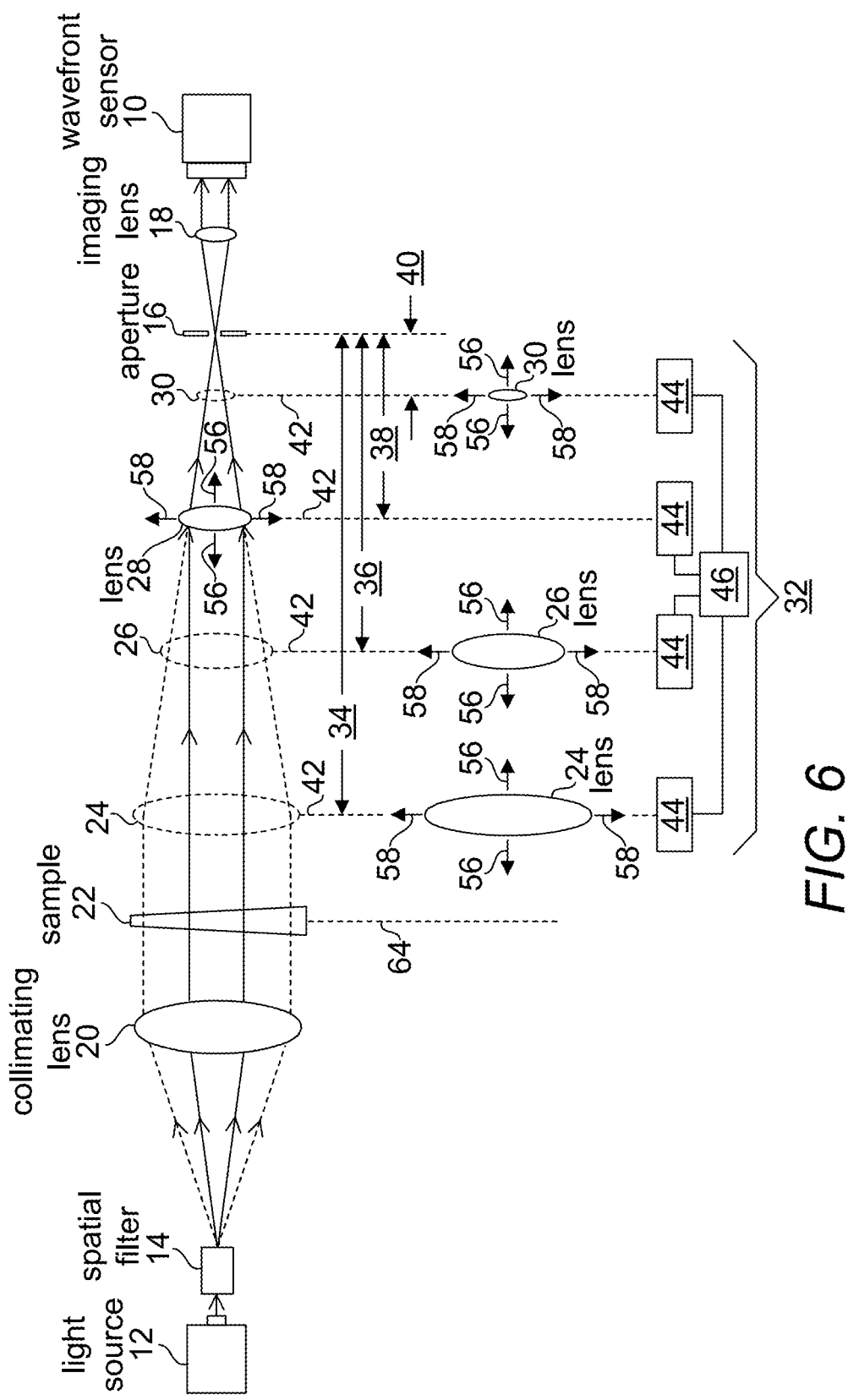
FIG. 6 is a diagram depicting a multi-configurable single-pass wavefront tester of FIG. 5 with at least one 2D linear stage.
Figure 7:
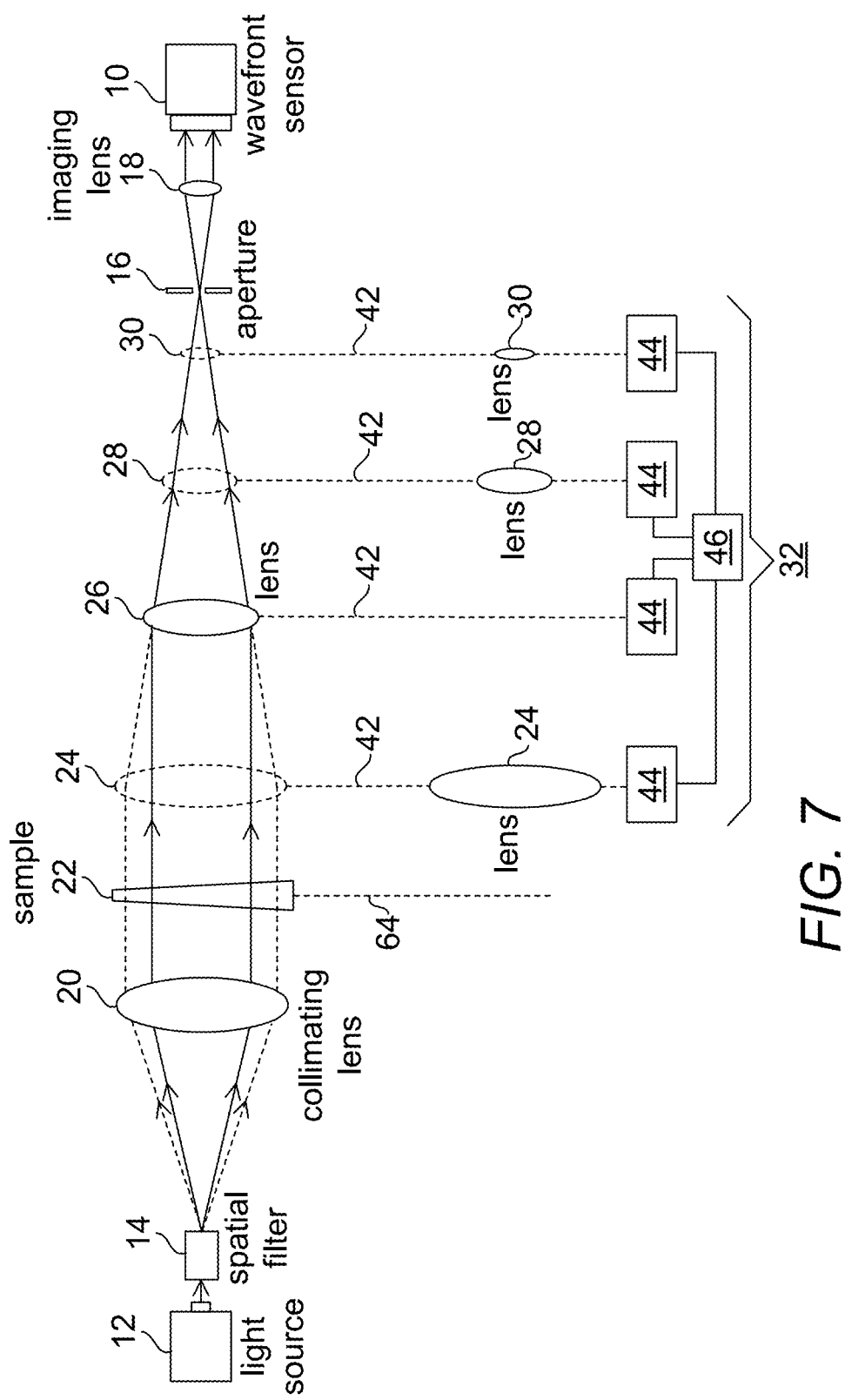
FIG. 7 is a diagram depicting a multi-configurable single-pass wavefront tester.
Figure 8:
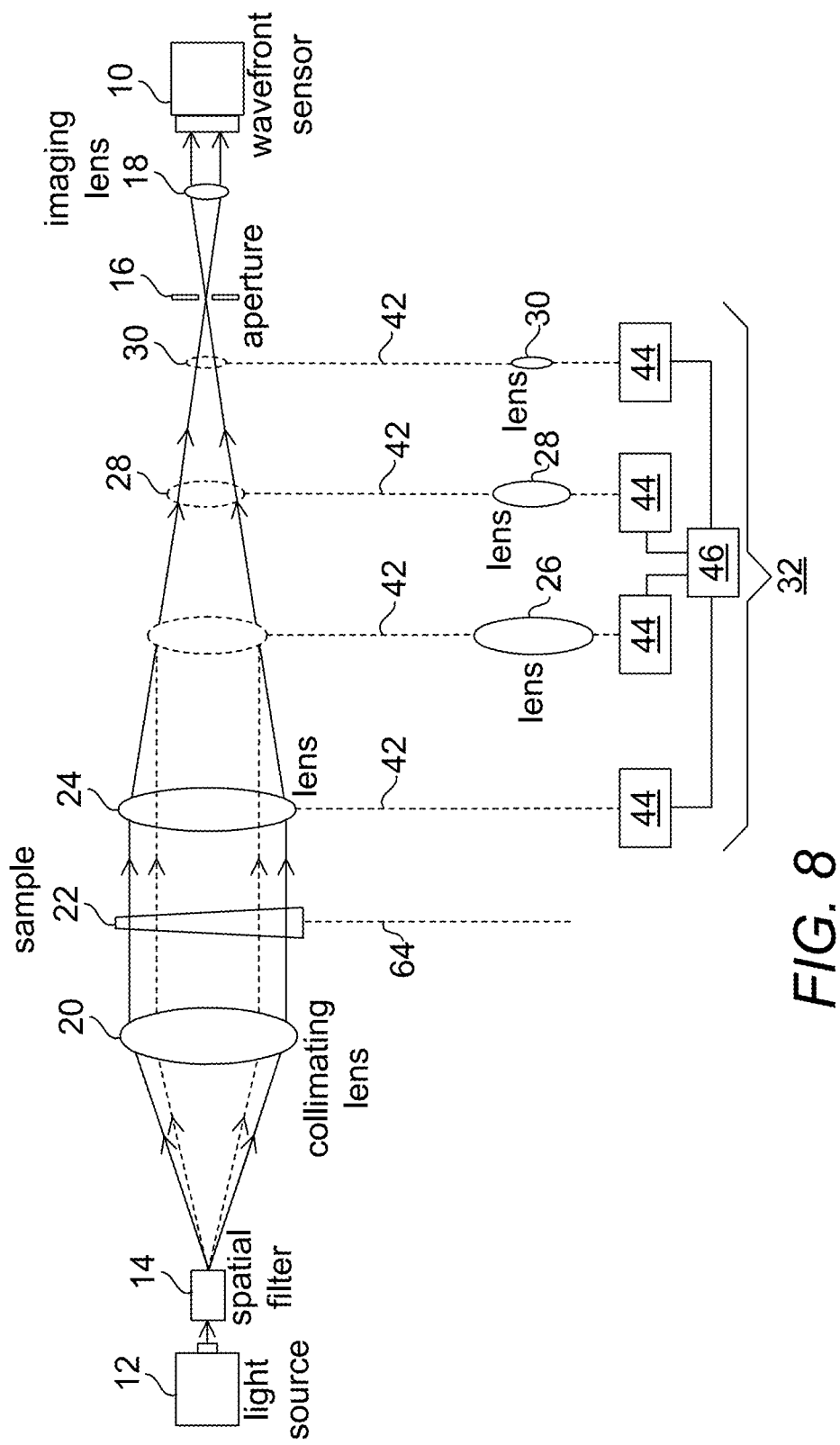
FIG. 8 is a diagram depicting a multi-configurable single-pass wavefront tester.

FIG. 5 is a diagram depicting a multi-configurable single-pass wavefront tester 4 for measuring the wavefront of a sample via an optical path. The wavefront tester 4 includes an imaging lens 18, an aperture 16, a collimating lens 20, a wavefront sensor 10, a suitable optical lens and a light source 12. In one embodiment, the light source is configured to be a spatial filtered light source with a spatial filter 14. The lens selection system 32 includes a plurality of optical lenses 24, 26, 28, 30, a suitable optical lens of which is commensurate with the sample and selected to be disposed in the optical path. Each of these lenses includes a unique focal length. In one example, the optical lens 24, 26, 28, 30 is disposed at distance 34, 36, 38, 40, respectively, from the aperture 16, illustrating the unique location of each lens with respect to the aperture 16 and hence the sample 22. Again, each optical lens 24, 26, 28, 30 is supported on a fixture disposed on a linear stage configured to dispose the optical lens in the optical path or remove the optical lens from the optical path using, e.g., a motor 44 controlled using a motor controller 46. The light source 12 is directed in a direction through the optical path characterized by the collimating lens 20, the sample 22, the suitable optical lens, the aperture 16 and the imaging lens 18 to be received at the wavefront sensor 10. In a conventional wavefront tester, only one optical lens is provided regardless of the physical size of sample 22. For instance, for the height of sample 22 shown in FIG. 5, an inappropriately sized lens, e.g., optical lens 28, or an optical lens that is incapable of casting light of light source, e.g., laser or light emitting diode (LED), across the height of the sample 22 is used. However, if optical lens 24 had been used, i.e., an optical lens capable of casting light across the height of sample 22, the light cast on the sample 22 would be commensurate with the physical size of the sample 22. FIG. 6 is a diagram depicting a multi-configurable single-pass wavefront tester of FIG. 5 with at least a two-dimensional (2D) linear stage. With a lens 24, 26, 28 or 30 disposed on a 2D linear stage, the flexibility to adjust its position along the optical path is provided. This allows for precise control over the focal length and position of the lens 24, 26, 28 or 30 along the optical path. By having the ability to move the lens 24, 26, 28 or 30 in and out of the optical path, it becomes easier to perform alignment tasks. A lens can be quickly inserted into or removed from the optical path in the directions of lateral adjustments 58, without disturbing the overall setup as each lens that is already mounted on a lens support of the 2D linear stage, already has a prescribed path controlled by a motor 44. This can save time and effort while the repeatability of the lens positioning is ensured. For a new sample 22 for which no wavefront measurements have been taken or established for the sample 22 of a specific size and wedge angle, positioning of each of lenses 24, 26, 28 and 30, is calibrated, in which position adjustments 56 of the lens 24, 26, 28 or 30 along the optical path once the desired lens has been disposed in the optical path, are made to ensure an optimal distance between the lens 24, 26, 28 or 30, and the aperture 16 has been achieved, i.e., the resulting image received at imaging lens 18 has the desired diameter and focus that corresponds to the sample 22. If wavefront measurements of a higher resolution are desired, "fine scanning" can be adopted using a smaller one of the optical lens 24, 26, 28 and 30, to "zoom in" on multiple small areas, e.g., with position adjustments 58, in order to collect spatial details of the wavefront of a sample with a physical size that is comparatively larger that the selected lens of the lenses 24, 26, 28 and 30. By scanning a relatively large area using a fine scanning configuration or in other words, by collecting wavefront data while the sample 22 is disposed in various positions in a transverse plane 64, e.g., using a linear stage, wavefront information can be obtained for a sample that is larger in physical size. As another example as shown in FIG. 7, if a sample 22 of a smaller size (height) had been used, optical lens 26 would not have been suitable as the light cast by lens 26 would result in insufficient coverage of the sample 22, resulting in the inaccurate collection of data at the wavefront sensor 10, thereby producing lower quality wavefront data. Therefore, for the sample 22 shown in FIG. 7, a suitable optical lens would have been optical lens 24 as shown disposed in the optical path of FIG. 8. In a conventional wavefront tester, only one optical lens is available for each tester. Therefore, for samples of significantly different sizes, several custom-made conventional wavefront testers would have been required to provide optical lenses of suitable sizes to produce wavefront measurement results of sufficient and required resolution as compared to a present wavefront tester already having a suitable optical lens for a wide range of sizes of a sample. For instance, for each of the optical lenses 24, 26, 28, 30 to function according to the required resolution of wavefront measurements when deemed a suitable optical lens for a sample, the optical lens is disposed at a unique distance from the aperture 16 in the optical path.

Figure 9:
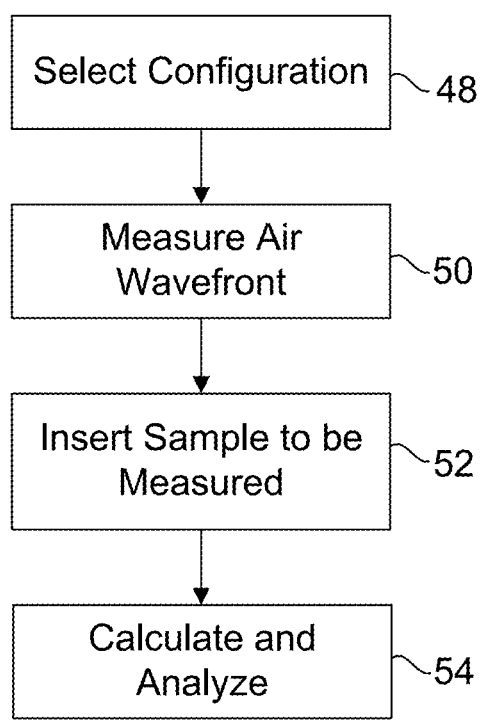
FIG. 9 is a diagram depicting a testing sequence using a present wavefront tester.

FIG. 9 is a diagram depicting a testing sequence using a present wavefront tester 2, 4 to obtain, e.g., the wedge angle and other related wavefront data. After selecting one of the configurations as indicated in step 48, a specific optical lens of the optical lenses 24, 26, 28, 30 is moved into the optical path. In the embodiment shown elsewhere herein, upon selection, the optical lens which is supported on a linear stage 42 is driven into the optical path of the respective wavefront tester 2, 4 using a motor 44 operationally coupled with the linear stage 42. Among other factors, the size of the sample used, and the required spatial resolution of the sample dictate the specific lens or configuration being chosen. For instance, the selected optical lens shall be suitable for casting light across substantially the entire height and width of the sample disposed in the optical path. The air wavefront of the wavefront tester 2, 4 without the optical lens 24, 26, 28 or 30 and the sample 22 under test is measured as in step 50. A sample 22 under test is then disposed in the optical path as in step 52 and its wavefront is then measured as in step 54 to generate actual wedge angle and refractive index of the sample 22 based on the air wavefront measured in step 50.

Figure 10:
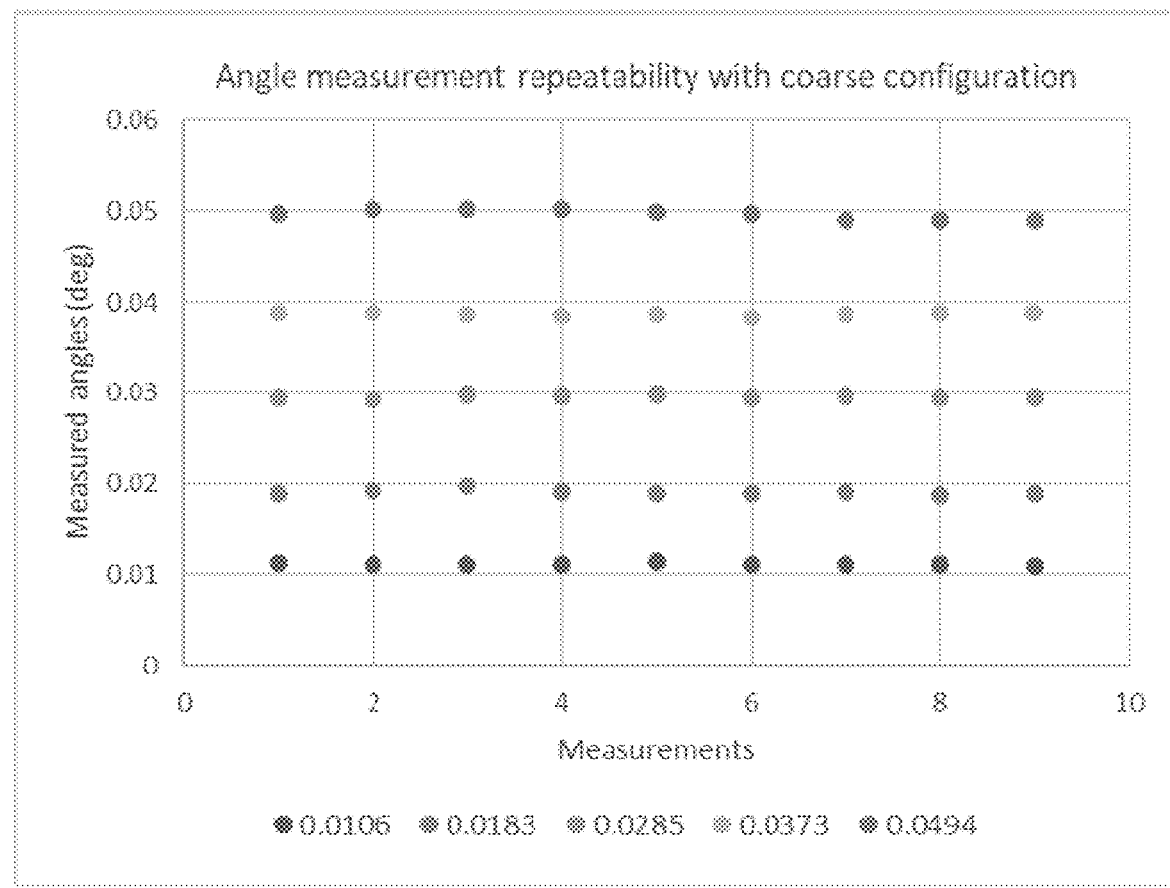
FIG. 10 is a diagram depicting the repeatability of wedge angle measurements in a coarse measurement configuration.
Figure 11:
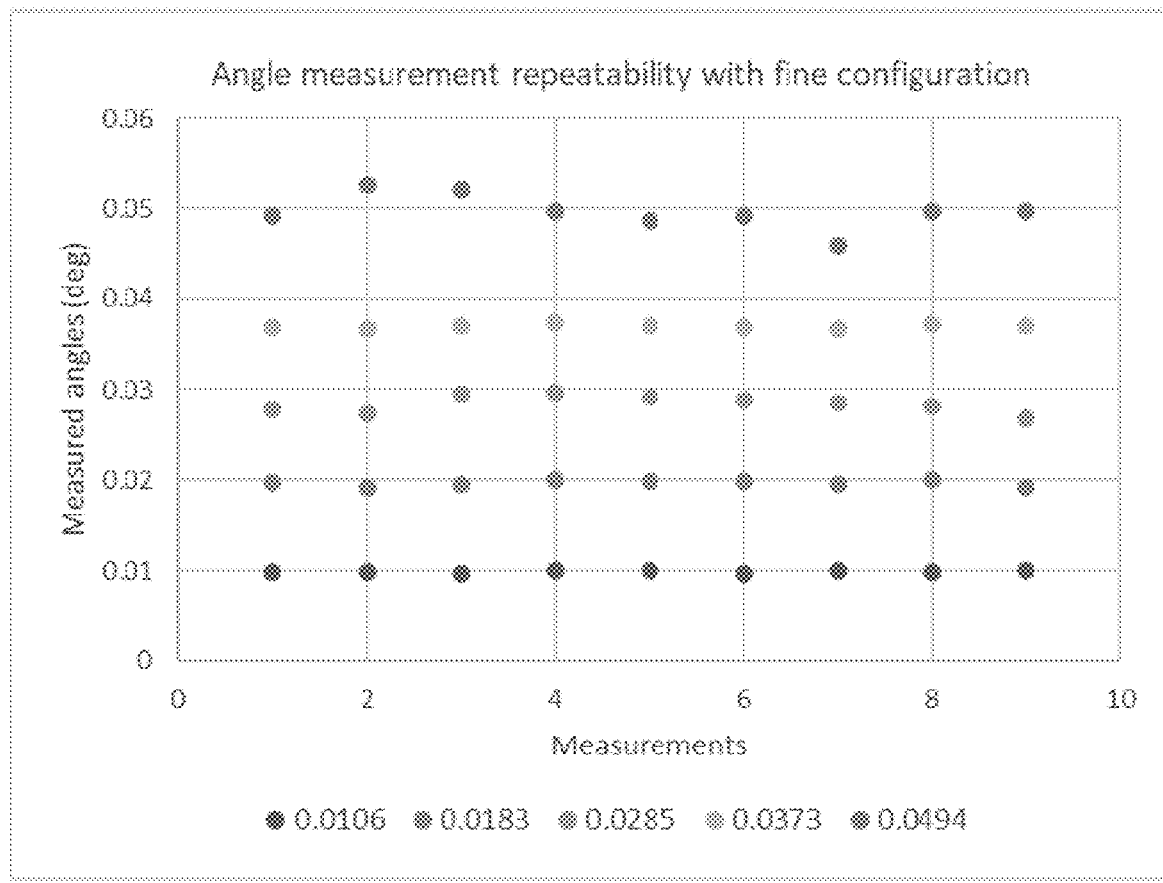
FIG. 11 is a diagram depicting the repeatability of wedge angle measurements in a fine measurement configuration.

FIG. 10 is a diagram depicting the repeatability of wedge angle measurements in a coarse measurement configuration. FIG. 11 is a diagram depicting the repeatability of wedge angle measurements in a fine measurement configuration. Referring to both figures, it shall be noted that coarse measurements seem to be more consistent with the measurements made using a Zygo® interferometer deemed the "actual angles." Both the coarse measurements and measurements made using a Zygo® interferometer, cover a large area of a sample for angle measurements and both are based on spatially-averaged results. Wedge angles measured using a fine measurement configuration seem to have slightly larger variations than those found with a coarse measurement configuration. This is due to small wavefront changes in fine measurement configurations as well as the limited resolution of wavefront sensors that were used the tester. By using high spatial resolution wavefront sensors, the repeatability of the fine measurements may be significantly improved.

FIG. 12 is a diagram depicting examples of the accuracy of wedge angle measurements in both coarse and fine measurement configurations using a setup shown in FIGS. 1-4. Here, accuracy is defined as the difference between a measured wedge angle and an actual wedge angle. Therefore, if the difference is zero, the accuracy is deemed perfect. Although non-zero, the average repeatability and accuracy values are considered good and the discrepancies can be attributed to sensor, e.g., wave sensor, fluctuations and are better compared to published results obtained using other devices and methods. The sample may not be perfectly uniform and local angle measurements obtained with the fine measurement configuration may vary slightly. The fine measurement configuration is more sensitive than the coarse measurement configuration as wavefront variations in the fine measurement configuration are much smaller, e.g., over six times smaller than the coarse measurement configuration. As air reference can change slightly over time, air reference shall be obtained each time before a wedge measurement is obtained.

Figure 13:
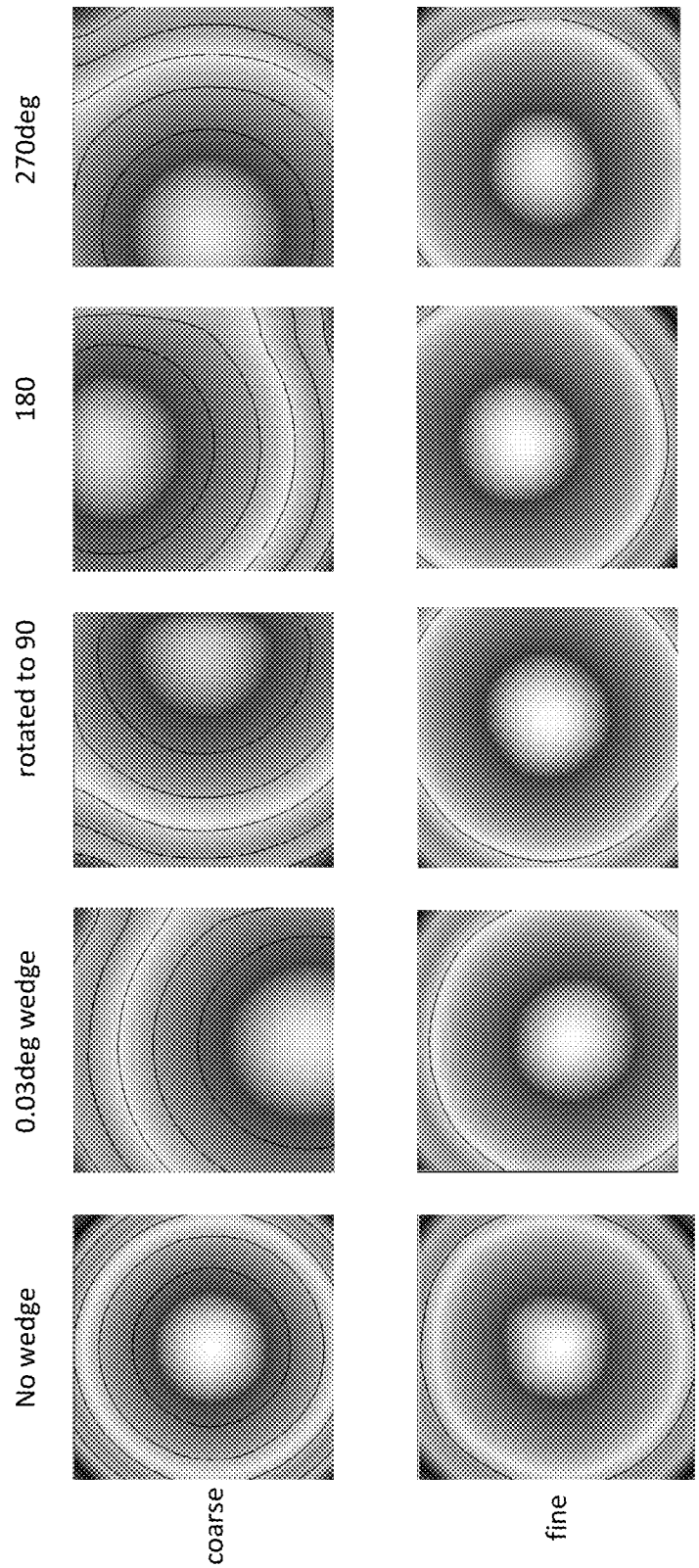
FIG. 13 is a diagram depicting wavefront shifts in both coarse and fine measurement configurations showing an image obtained where a wedge is absent, a 0.03-degree wedge is present, the 0.03-degree wedge is rotated 90 degrees, the 0.03-degree wedge is rotated 180 degrees and the 0.03-degree wedge is rotated 270 degrees, each about an optical axis of the optical path.
Figure 14:
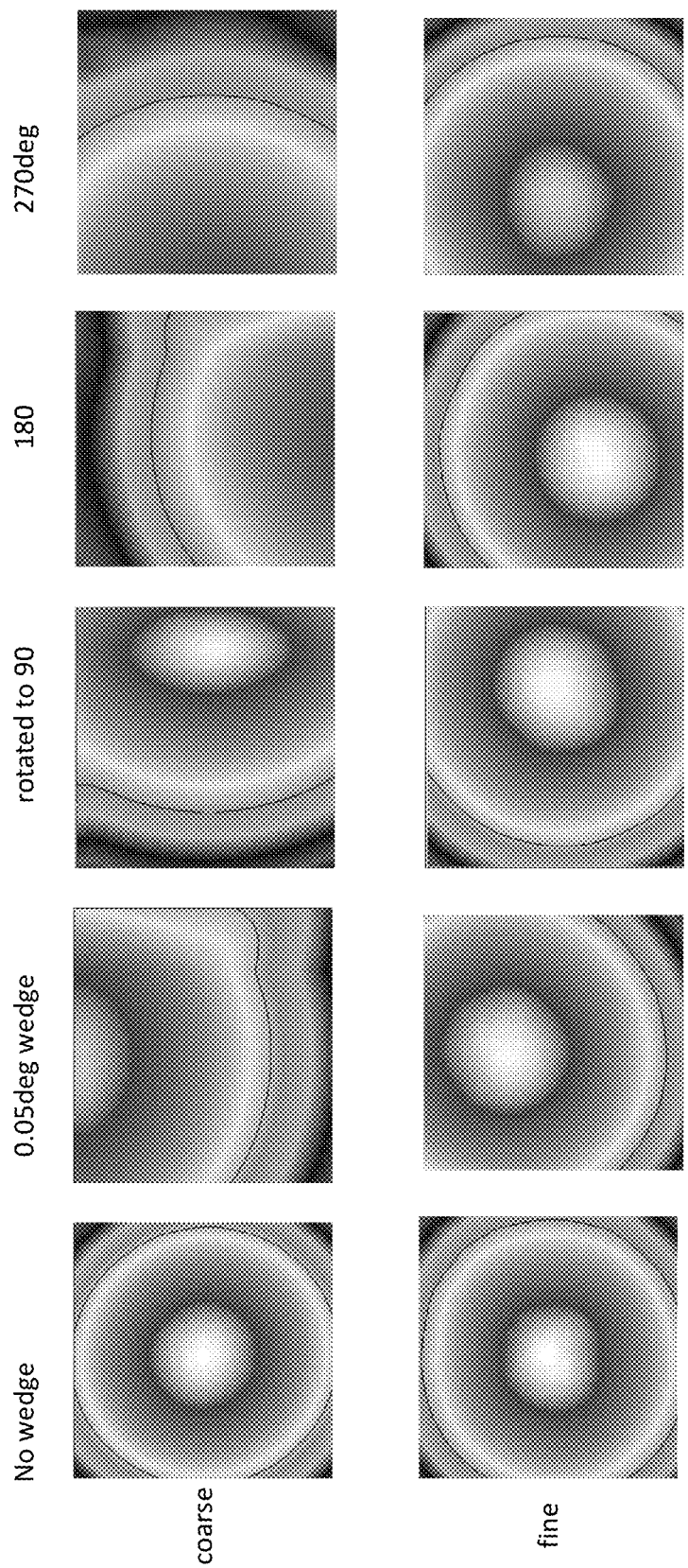
FIG. 14 is a diagram depicting wavefront shifts in both coarse and fine measurement configurations showing an image obtained where a wedge is absent, a 0.05-degree wedge is present, the 0.05-degree wedge is rotated 90 degrees, the 0.05-degree wedge is rotated 180 degrees and the 0.05-degree wedge is rotated 270 degrees, each about an optical axis of the optical path.

FIG. 13 is a diagram depicting wavefront shifts in both coarse and fine measurement configurations showing an image obtained where a wedge is absent, a 0.03-degree wedge is present, the 0.03-degree wedge is rotated 90 degrees, the 0.03-degree wedge is rotated 180 degrees and the 0.03-degree wedge is rotated 270 degrees, each about an optical axis of the optical path. FIG. 14 is a diagram depicting wavefront shifts in both coarse and fine measurement configurations showing an image obtained where a wedge is absent, a 0.05-degree wedge is present, the 0.05-degree wedge is rotated 90 degrees, the 0.05-degree wedge is rotated 180 degrees and the 0.05-degree wedge is rotated 270 degrees, each about an optical axis of the optical path. FIGS. 13-14 are useful for verifying that the present wavefront testers work properly, both from the perspective of optical alignment and calibration and ready for testing samples.

Figure 15:
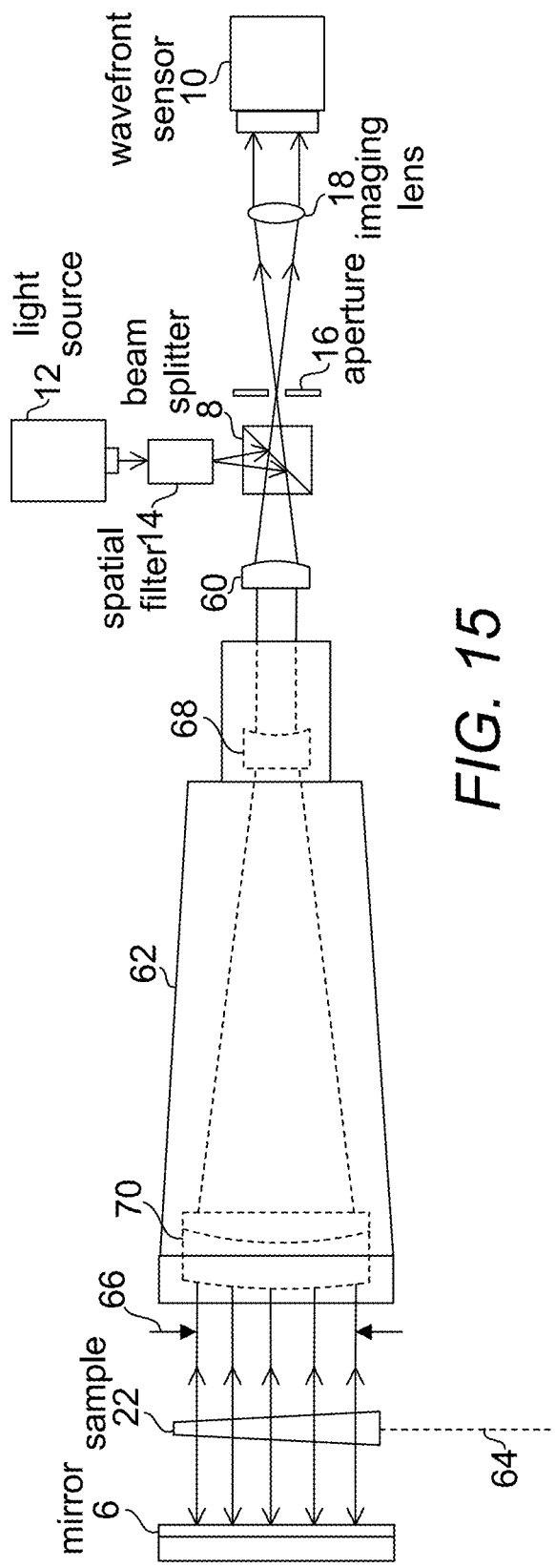
FIG. 15 is a diagram depicting a continuously-configurable double-pass wavefront tester utilizing a beam expander.
Figure 16:
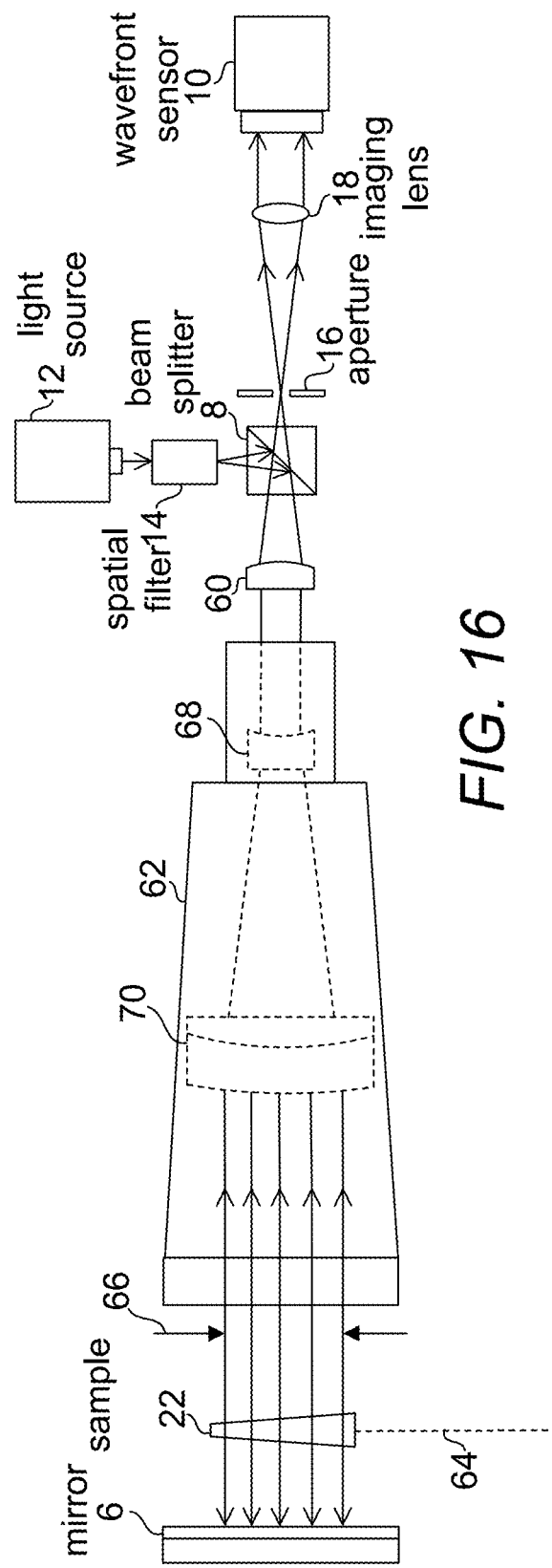
FIG. 16 is a diagram depicting a continuously-configurable double-pass wavefront tester utilizing a beam expander as shown in FIG. 15 but with a different sample.

FIG. 15 is a diagram depicting a continuously-configurable double-pass wavefront tester utilizing a beam expander. It shall be noted that the continuously-configurable double-pass wavefront tester of FIG. 15 shares all the same components as the multi-configurable double-pass wavefront tester of FIG. 1, with the exception that the lens system of FIG. 1 has been replaced with a beam expander 62 and a pre-collimating lens 60. Here, the width 66 of the output beam of the beam expander 62 can be adjusted to suit the physical size of the sample 22 or to suit the desired wavefront measurement resolution when the sample 22 is scanned at different positions along the transverse plane 64. The wavefront tester includes a mirror 6, an imaging lens 18, an aperture 16, a beam splitter 8, a pre-collimating lens 60, a wavefront sensor 10, a beam expander 62 and a light source 12. The beam expander 62 includes a first end and a second end and it is configured to receive a beam at the first end and cause a width of the beam to be adjustable at the second end. A beam expander is an optical device used to increase the diameter of a collimated input beam of light that is the output of the pre-collimating lens 60. A beam expander typically includes a pair of lenses or lens systems arranged in such a way that the input beam passes through the first lens 68 (referred to as the "collimating lens") and then the expanded beam exits through the second lens 70 (referred to as the "focusing lens"). The spacing between the two lenses 68, 70 is adjusted to achieve the desired beam expansion ratio. If coarse measurements are desired, wavefront measurements can be obtained in a "snapshot" fashion without scanning, using an output of the beam expander 62 that is commensurate with the physical size of the sample 22, thereby leaving the testing speed high as wavefront measurements can be taken in a single setup and no "scanning" of partial areas of the sample 22 is necessary. In use, a light source 12 is directed in a first direction through the optical path by the beam splitter 8 through the pre-collimating lens 60, the beam expander 62 from the first end to the second end and the sample 22 to the mirror 6 such that the light source 12 is redirected in a second direction opposite the first direction through the optical path and the beam splitter 8, the aperture 16 and the imaging lens 18 to be received at the wavefront sensor 10. If wavefront measurements of a higher resolution are desired, "fine scanning" can be effected by controlling the beam expander 62 to a width 64 which covers only a portion of the size or height of the sample 22 such that wavefront measurements can be taken only of the small area. The sample 22 is then moved in a direction along the transverse plane 64 such that wavefront measurements can be taken only of a new small area. This process can be repeated until data has been collected over the desired area of the sample 22. FIG. 16 is a diagram depicting a continuously-configurable double-pass wavefront tester utilizing a beam expander as shown in FIG. 15 but with a different sample 22. It shall be noted that as a physically less prominent sample is used, the width 66 of the output beam of the beam expander 62 can be adjusted to correspond with the height of the sample 22 by reducing the spacing between the lenses 68, 70. It shall also be noted that, with the use of a beam expander, the width 64 can continuously vary between two limits, i.e., an upper limit when the spacing between the lenses 68, 70 is at its maximum and a lower limit when the spacing between the lenses 68, 70 is at its minimum.

Figure 17:
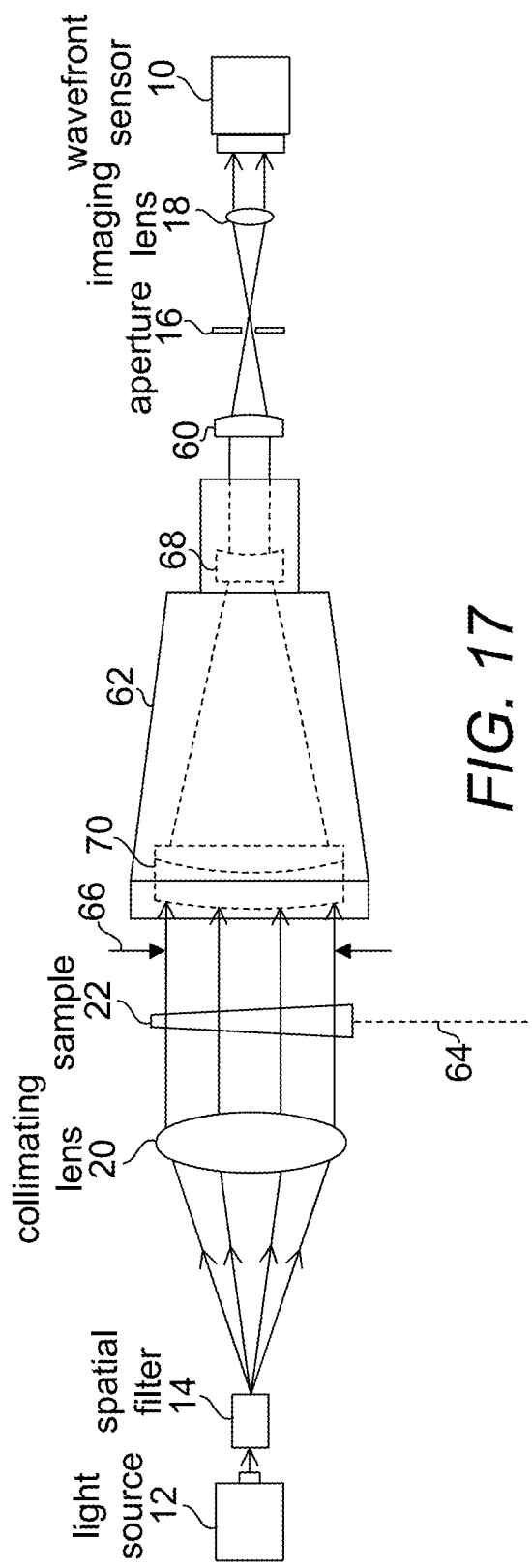
FIG. 17 is a diagram depicting a continuously-configurable single-pass wavefront tester utilizing a beam expander.
Figure 18:
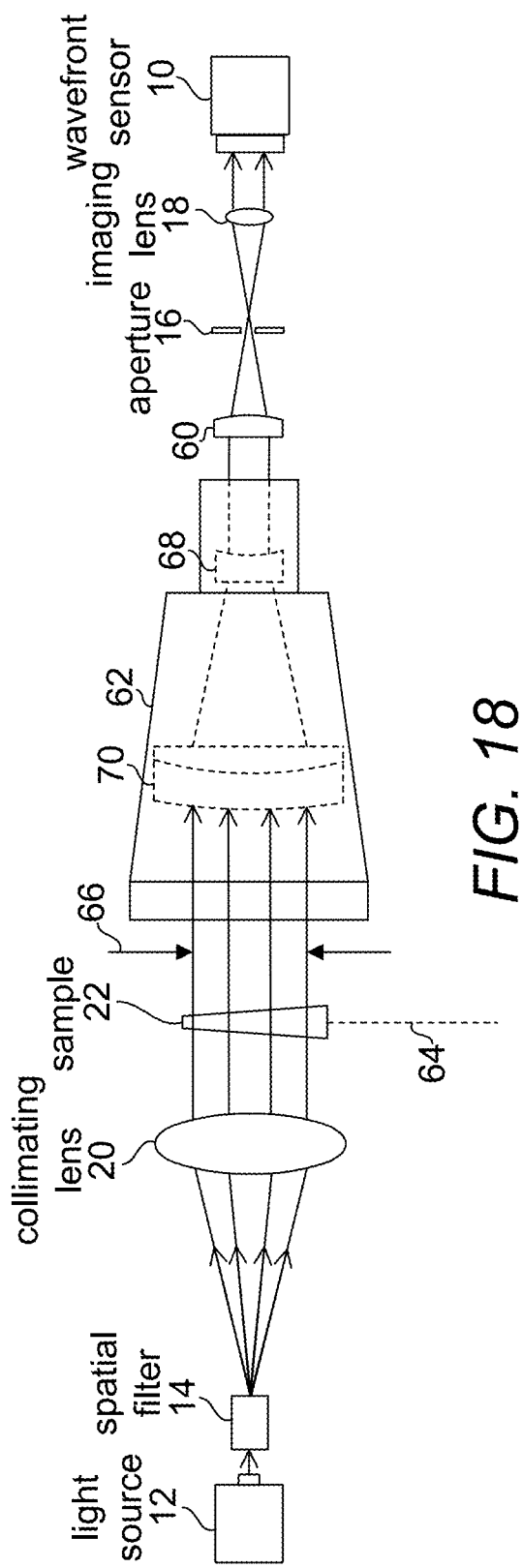
FIG. 18 is a diagram depicting a continuously-configurable double-pass wavefront tester utilizing a beam expander as shown in FIG. 17 but with a different sample.

FIG. 17 is a diagram depicting a continuously-configurable single-pass wavefront tester utilizing a beam expander. It shall be noted that the continuously-configurable double-pass wavefront tester of FIG. 16 shares all the same components as the multi-configurable double-pass wavefront tester of FIG. 5 with the exception that the lens system of FIG. 5 has been replaced with a beam expander 62 and a pre-collimating lens 60. Here, the width 66 of the output beam of the beam expander 62 can be adjusted to suit the physical size of the sample 22 or to suit the desired wavefront measurement resolution when the sample 22 is scanned at different positions along the transverse plane 64. The wavefront tester 4 includes an imaging lens 18, an aperture 16, a collimating lens 20, a wavefront sensor 10, a pre-collimating lens 60, a beam expander 62 and a light source 12. The beam expander 62 includes a first end and a second end and it is configured to receive a beam at the first end and cause a width of the beam to be adjustable at the second end. If coarse measurements are desired, wavefront measurements can be obtained in a "snapshot" fashion without scanning, using an output of the beam expander 62 that is commensurate with the physical size of the sample 22, thereby leaving the testing speed high as wavefront measurements can be taken in a single setup and no "scanning" of partial areas of the sample 22 is necessary. In use, a light source 12 is directed in a first direction through the optical path characterized by the collimating lens 20, the sample 22, the beam expander 62, the pre-collimating lens 60, the aperture 16 and the imaging lens 18 to be received at the wavefront sensor 10. If wavefront measurements of a higher resolution are desired, "fine scanning" can be effected by controlling the beam expander 62 to a width 66 which covers only a portion of the size or height of the sample 22 such that wavefront measurements can be taken only of a small area. The sample 22 is then moved in a direction along the transverse plane 64 such that wavefront measurements can be taken only of a new small area. This process can be repeated until data has been collected over the desired area of the sample 22. FIG. 18 is a diagram depicting a continuously-configurable double-pass wavefront tester utilizing a beam expander as shown in FIG. 17 but with a different sample 22. It shall be noted that as a physically less prominent sample is used, the width 66 of the output beam of the beam expander 62 can be adjusted to correspond with the height of the sample 22 by reducing the spacing between the lenses 68, 70.

The detailed description refers to the accompanying drawings that show, by way of illustration, specific aspects and embodiments in which the present disclosed embodiments may be practiced. These embodiments are described in sufficient detail to enable those skilled in the art to practice aspects of the present invention. Other embodiments may be utilized, and changes may be made without departing from the scope of the disclosed embodiments. The various embodiments can be combined with one or more other embodiments to form new embodiments. The detailed description is, therefore, not to be taken in a limiting sense, and the scope of the present invention is defined only by the appended claims, with the full scope of equivalents to which they may be entitled. It will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description. The scope of the present disclosed embodiments includes any other applications in which embodiments of the above structures and fabrication methods are used. The scope of the embodiments should be determined with reference to the appended claims, along with the full scope of equivalents to which such claims are entitled.

What is claimed herein is:

1. A wavefront tester for measuring the wavefront comprising the wedge angle of a sample via an optical path, said wavefront tester comprising:
   (a) a mirror;
   (b) an imaging lens;
   (c) an aperture;
   (d) a beam splitter;
   (e) a wavefront sensor;
   (f) a pre-collimating lens;
   (g) a beam expander comprising a first end and a second end, said beam expander configured to receive a beam at said first end and cause a width of the beam to be adjustable at said second end, wherein said beam expander is adjusted such that the width is commensurate with the physical size of the sample; and
   (h) a light source directed in a first direction through the optical path by said beam splitter through said pre-collimating lens, said beam expander from said first end to said second end and the sample to said mirror such that said light source is redirected in a second direction opposite said first direction through the optical path and said beam splitter, said aperture and said imaging lens to be received at said wavefront sensor.

2. The wavefront tester of claim 1, wherein said light source comprises a light source selected from the group consisting of a laser light source and a light emitting diode (LED) light source.

3. The wavefront tester of claim 1, wherein said light source is configured to be a spatial filtered light source with a spatial filter.

4. A wavefront tester for measuring the wavefront comprising the wedge angle of a sample via an optical path, said wavefront tester comprising:
   (a) an imaging lens;
   (b) an aperture;
   (c) a collimating lens;
   (d) a wavefront sensor;
   (e) a pre-collimating lens;
   (f) a beam expander comprising a first end and a second end, said beam expander configured to receive a beam at said first end and cause a width of the beam to be adjustable at said second end, wherein said beam expander is adjusted such that the width is commensurate with the physical size of the sample; and
   (g) a light source directed in a direction through the optical path characterized by said collimating lens, the sample, said beam expander, said pre-collimating lens, said aperture and said imaging lens to be received at said wavefront sensor.

5. The wavefront tester of claim 4, wherein said light source comprises a light source selected from the group consisting of a laser light source and a light emitting diode (LED) light source.

6. The wavefront tester of claim 4, wherein said light source is configured to be a spatial filtered light source with a spatial filter.

* * * * *